(12) United States Patent
Ikeda

(10) Patent No.: US 8,863,495 B2
(45) Date of Patent: Oct. 21, 2014

(54) IGNITION/CHEMICAL REACTION PROMOTION/FLAME HOLDING DEVICE, SPEED-TYPE INTERNAL COMBUSTION ENGINE, AND FURNACE

(75) Inventor: Yuji Ikeda, Kobe (JP)

(73) Assignee: Imagineering, Inc., Hyogo (JP)

( * ) Notice: Subject to any disclaimer, the term of this patent is extended or adjusted under 35 U.S.C. 154(b) by 1270 days.

(21) Appl. No.: 12/668,826

(22) PCT Filed: Jul. 12, 2008

(86) PCT No.: PCT/JP2008/062642
§ 371 (c)(1),
(2), (4) Date: Jan. 12, 2010

(87) PCT Pub. No.: WO2009/008524
PCT Pub. Date: Jan. 15, 2009

(65) Prior Publication Data
US 2010/0186368 A1    Jul. 29, 2010

(30) Foreign Application Priority Data
Jul. 12, 2007    (JP) .................................. 2007-183750

(51) Int. Cl.
*F02C 7/264* (2006.01)
*F02G 1/055* (2006.01)
(Continued)

(52) U.S. Cl.
CPC .................. *F02C 7/266* (2013.01); *F02P 15/02* (2013.01); *F05D 2220/80* (2013.01); *F05D*
(Continued)

(58) Field of Classification Search
USPC .............. 60/39.06, 39.821, 776, 778, 39.827, 60/39.828
See application file for complete search history.

(56) References Cited

U.S. PATENT DOCUMENTS 3,618,526 A * 11/1971 Baker ........................... 102/201
3,934,566 A    1/1976 Ward
(Continued)

FOREIGN PATENT DOCUMENTS

JP    51-77719        7/1976
JP    57-119164 A     7/1982
(Continued)

OTHER PUBLICATIONS

International Search Report of PCT/JP2008/062637, mailing date of Aug. 5, 2008.
(Continued)

*Primary Examiner* — Craig Kim
(74) *Attorney, Agent, or Firm* — Westerman, Hattori, Daniels & Adrian, LLP

(57) ABSTRACT

An ignition/chemical reaction promotion/flame holding device and a high-performance speed-type internal combustion engine using this device are provided, whereby ignition and the spreading and holding of flames can be dramatically improved in a gas turbine, a ram machine, a rocket engine, or another speed-type internal combustion engine. An ignition/chemical reaction promotion/flame holding device of a speed-type internal combustion engine comprises a spark plug for preparing charged particles in a predetermined location in a combustor of the speed-type internal combustion engine, and a microwave oscillator and antenna for inducing plasma with a working fluid in the combustor as a starter material by irradiating the charged particles and their surrounding vicinity with microwave pulses; wherein a region in which sufficient conditions for performing combustion are met is formed in the combustor by supplying an active chemical species produced from the working fluid by the effect of the plasma.

21 Claims, 9 Drawing Sheets

(51) Int. Cl.
 *F02G 3/00* (2006.01)
 *F02P 15/02* (2006.01)
 *F02C 7/266* (2006.01)
 *F02P 15/00* (2006.01)
 *F02P 23/04* (2006.01)
 *F23C 99/00* (2006.01)
 *F02P 15/08* (2006.01)

(52) U.S. Cl.
 CPC ............ 2220/10 (2013.01); *F23C 2900/99003* (2013.01); *F23R 2900/00008* (2013.01); *F23R 2900/00006* (2013.01); *F02P 15/003* (2013.01); *F02P 15/08* (2013.01); *F02P 23/045* (2013.01); *F23C 99/001* (2013.01); *Y02T 50/671* (2013.01); *F02P 23/04* (2013.01); *F02C 7/264* (2013.01); *F23C 2900/99005* (2013.01)
 USPC ......... 60/39.821; 60/776; 60/778; 60/39.827; 60/39.828

(56) References Cited

U.S. PATENT DOCUMENTS

| | | | |
|---|---|---|---|
| 4,138,980 A | | 2/1979 | Ward |
| 4,926,001 A | | 5/1990 | Alagy et al. |
| 5,270,515 A | | 12/1993 | Long |
| 5,288,969 A | | 2/1994 | Wong et al. |
| 5,418,430 A | | 5/1995 | Bayliss |
| 5,442,907 A | * | 8/1995 | Asquith et al. ............. 60/778 |
| 5,490,973 A | | 2/1996 | Grothaus et al. |
| 5,646,489 A | | 7/1997 | Kakehi et al. |
| 5,673,554 A | * | 10/1997 | DeFreitas et al. ........ 60/39.821 |
| 5,689,949 A | * | 11/1997 | DeFreitas et al. ............. 60/776 |
| 5,750,823 A | | 5/1998 | Wofford et al. |
| 5,845,480 A | * | 12/1998 | DeFreitas et al. ............. 60/776 |
| 6,007,742 A | | 12/1999 | Czernichowski et al. |
| 6,029,602 A | | 2/2000 | Bhatnagar |
| 6,329,628 B1 | | 12/2001 | Kuo et al. |
| 6,545,420 B1 | | 4/2003 | Collins et al. |
| 6,806,439 B2 | | 10/2004 | Uhm et al. |
| 6,888,040 B1 | | 5/2005 | Shufflebotham et al. |
| 2003/0206833 A1 | | 11/2003 | Obee et al. |
| 2007/0209634 A1 | | 9/2007 | Minami |

FOREIGN PATENT DOCUMENTS

| | | | |
|---|---|---|---|
| JP | 57-148022 A | | 9/1982 |
| JP | 7-012037 A | | 1/1995 |
| JP | 2000-179412 A | | 6/2000 |
| JP | 2000-325734 A | | 11/2000 |
| JP | 2001-300296 A | | 10/2001 |
| JP | 2002-195151 A | | 7/2002 |
| JP | 2002-295259 A | | 10/2002 |
| JP | 2002-295264 A | | 10/2002 |
| JP | 2004-216231 A | | 8/2004 |
| JP | 2005-171812 A | | 6/2005 |
| JP | 2005-246353 A | | 9/2005 |
| JP | 2005-319357 A | | 11/2005 |
| JP | 2006-132518 A | | 5/2006 |
| JP | 2006-187766 A | | 7/2006 |
| JP | 2007-113570 A | | 5/2007 |
| JP | 2007-270824 B1 | | 10/2007 |
| JP | 2008-036080 A | | 2/2008 |
| WO | 2007/048994 A1 | | 5/2007 |
| WO | 2008/035448 A1 | | 3/2008 |

OTHER PUBLICATIONS

McAdams, "Prospects for non-thermal atmospheric plasmas for pollution abatement"; Journal of Physics D: Applied Physics. 34 (2001); pp. 2810-2821.

Mizeraczyk et al., "Hazardous gas treatments using atmospheric pressure microwave discharges"; Plasma Physics and Controlled Fusion, 47 (2005), pp. B589-B602.

Uhm et al., "A microwave plasma torch and its applications"; Plasma Sources Science and Technology 15 (2006), pp. S26-S34.

International Search Report of PCT/JP2009/054965, mailing date Jun. 9, 2009.

International Search Report of PCT/JP2008/062642, mailing date of Sep. 2, 2008.

* cited by examiner

IGNITION/CHEMICAL REACTION PROMOTION/FLAME HOLDING DEVICE, SPEED-TYPE INTERNAL COMBUSTION ENGINE, AND FURNACE

TECHNICAL FIELD

The disclosure relates to an ignition/chemical reaction promotion/flame holding device for gas turbines, pulse jet engines, jet propulsion engines that use gas turbines, ram machines, scramjet engines, rocket engines, or other speed-type internal combustion engines; or boilers, flame furnaces, gas fusion furnaces, waste combustion furnaces, or other types of furnaces. The disclosure particularly relates to an ignition/chemical reaction promotion/flame holding in which proper ignition and combustion are ensured using plasma, and also to a speed-type internal combustion engine and furnace that use this ignition/chemical reaction promotion/flame holding device.

BACKGROUND OF THE INVENTION

A speed-type internal combustion engine, typified by a gas turbine, is a machine in which a working fluid is accelerated by energy generated by combustion, wherein the working fluid flows through a combustor at a high speed. If the temperature and pressure of the working fluid as well as the mixture ratio between the oxidizing agent and fuel are kept constant, flames can be formed, propagated, and maintained in a stable manner.

However, in practice, it is extremely difficult to keep these working fluid conditions constant. Discrepancies arise in the pressure and temperature, and both regions of high fuel concentration and regions of high oxidizing agent concentration arise in the combustor. Such discrepancies change progressively over time.

Therefore, the flame propagation speed fluctuates according to the mixture ration of the fuel and oxidizing agent, and discrepancies arise in the combustion temperature and the ease of ignition. These discrepancies induce combustion oscillation and flame extinguishing.

In view of this, the following measures are commonly used in order to form, propagate, and maintain flames in a speed-type internal combustion engine in a stable manner.

(1) In order to increase the combustion speed, the fuel and oxidizing agent are mixed, the objective being a concentration mixture ratio of about 1.1 times the stoichiometric mixture ratio.

(2) In order to take advantage of the rate of turbulent combustion being higher than the rate of laminar combustion, a turbulent flow or swirl flow is formed in the combustor. For example, in a gas turbine, a recirculation zone where a bulk (branch flow) occurs is created in the combustor by the formation of a swirl flow by the swirler and by the introduction of an oxidizing agent from the side surface of the combustor. A frame holder is also provided in the location of the combustor or afterburner in a jet propulsion engine.

(3) Two-stage combustion is performed by diffusion combustion using a pilot burner.

(4) In the case of flame extinguishing, discharge is repeated several times at a high energy of about 1 joule using a spark plug to attempt re-ignition.

In addition to the measures described above, the use of specialized ignition devices or flame holding devices has also been attempted. For example, in a scramjet engine, a small rocket engine is provided in proximity to the inlet of the combustor, and an attempt is made to perform ignition and flame holding with this small rocket engine.

The use of plasma has also been attempted, for example. Patent Document 1 discloses an ignition device in which a high-temperature gas of several thousand degrees is blown into the combuster by using a plasma torch. Patent Document 2 discloses a rocket engine in which ignition and flame holding are performed by irradiating the combustor interior with laser light and converting the propellant into plasma gas using the heat supplied by the energy of the laser light.

[Patent Document 1] Japanese Patent Application Laid-open Publication No. 2005-171812

[Patent Document 2] Japanese Patent Application Laid-open Publication No. 2002-195151

SUMMARY OF THE INVENTION

However, these devices have the following problems, which make it difficult to use a speed-type internal combustion engine.

Specifically, since it is difficult to stabilize the fuel concentration, the measure for mixing at 1.1 times the stoichiometric ratio cannot be a reliable device as described above. Even if mixing is performed in a stable manner, the combustion rate increases with this mixture ratio, but on the other hand, ignition performance is poor. What is even less desirable is that a large amount of fuel is consumed by this device. Not only is this an environmental problem, but since more fuel must be prepared in advance, it is extremely disadvantageous for an aircraft, rocket, or spacecraft in which weight is directly tied to flying time, range, or payload weight.

A device for forming a turbulent flow or swirl flow is limited in the range whereby these effects can be achieved. Specifically, when the disturbance produced in the flow of the working fluid by the flame holder becomes too strong, extinction (extinguishing of flames) occurs and the flames are lost. When the bulk speed becomes too fast in recirculation, blowing off (flames being blown out) occurs.

In a device that uses a pilot burner, regions of high fuel concentration are steadily being formed in the combustor. These regions constantly have high-temperature flames, resulting in so-called hot spots. In a speed-type internal combustion engine that uses air as an oxidizing agent, the temperature of these flames is the cause of the formation of harmful nitrogen oxide. The side surfaces in the vicinity of hot spots are also constantly exposed to high temperatures. Therefore, in this device, the wall surfaces of the combustor must be cooled. In order to perform cooling, a measure such as diverting some of the air supply to a cooling-designated liner must be taken, and efficiency is lost proportionately. What is even less desirable is that in order to increase ignition performance in a device of this type, either the pilot burner must be increased in size, or multiple pilot burners must be used. Not only does this lead to a weight increase, but it also has the result of making the hot spots extremely large, making the above-described hot spot problem increasingly worse.

The success rate of re-ignition with a spark plug is extremely low compared to that of a capacitive internal combustion engine. In order to increase the rate of success of re-ignition even slightly, the input energy must be increased or discharge must be performed repeatedly, but even so, re-ignition is not regarded to occur reliably. In order to increase the rate of success of ignition, a spark plug must be installed in a region where fuel is rich and the flow rate of the working fluid is somewhat high. Therefore, the ignition locations are limited for re-ignition with a spark plug.

A device in which a small rocket engine is provided in proximity to the combustor inlet has the same hot spot problem as a pilot burner, as high-temperature regions are steadily being formed. What is even less desirable is that the device must be provided with extra oxidizing agent as well as fuel, which is disadvantageous in terms of weight.

A device that uses a plasma torch also has problems with hot spots. A high input energy is needed in order to continually form thermal plasma. Therefore, a high-capacity battery, transformer, or the like must be installed as an energy source, which is disadvantageous in terms of weight. The effect of the plasma can only be achieved in the regions into which plasma is blown by the torch, and the effective range is thereby limited.

In a device that uses laser light, high output lasers must converge, and the spatial region where ignition, flame holding, and the like can be performed is small. The working fluid in this small region is not always necessarily in a state suitable for re-ignition or flame holding, and the success rate of this measure is low. This measure cannot achieve its effects if the region irradiated with laser light has an extremely high temperature. Therefore, this device also has problems with hot spots.

An ignition/chemical reaction promotion/flame holding device and a high-performance speed-type internal combustion engine that uses this ignition/chemical reaction promotion/flame holding device are provided, whereby ignition and the spreading and maintaining of flames can be dramatically improved in a speed-type internal combustion engine.

According to a first aspect, an ignition/chemical reaction promotion/flame holding device for a speed-type internal combustion engine comprises a charged particle preparation portion preparing charged particles in a predetermined location in a combustor of a speed-type internal combustion engine; and one or a plurality of electromagnetic wave irradiators irradiating the charged particles and their surrounding vicinity with electromagnetic wave pulses in order to induce plasma, a working fluid in the combustor being used as a starter material; wherein an active chemical species produced from the working fluid by the effect of the plasma is supplied, whereby a region in which sufficient conditions for performing combustion are fulfilled is formed in the combustor.

According to a second aspect, an ignition/chemical reaction promotion/flame holding device for a speed-type internal combustion engine comprises a charged particle preparation portion preparing charged particles in a predetermined location in a working fluid inlet passage leading to a combustor of the speed-type internal combustion engine; and one or a plurality of electromagnetic wave irradiators irradiating the charged particles and their surrounding vicinity with electromagnetic wave pulses in order to induce plasma, a working fluid in the combustor being a starter material; wherein an active chemical species produced from the working fluid by the effect of the plasma is supplied, whereby a region in which sufficient conditions for performing combustion are fulfilled is formed in the combustor.

According to a third aspect, the ignition/chemical reaction promotion/flame holding device of the first aspect is preferably configured such that the one or more electromagnetic wave irradiators continue to radiate electromagnetic wave pulses while the temperature of gas or ions in the plasma remains less than the electron temperature in the plasma after plasma induction has begun.

According to a fourth aspect, the ignition/chemical reaction promotion/flame holding device of the first aspect is preferably configured such that the charged particle preparation portion continues to prepare the charged particles after the active chemical species has been produced when the working fluid is ignited, whereby a space is formed having an energy density equal to or greater than the minimum ignition energy of the working fluid in the presence of the active chemical species.

According to a fifth aspect, the ignition/chemical reaction promotion/flame holding device of the first aspect is preferably configured such that the plasma causes a region having an energy density equal to or greater than the minimum ignition energy and a region having an energy density less than the minimum ignition energy to be distributed in the time domain or the space domain.

According to a sixth aspect, the ignition/chemical reaction promotion/flame holding device of the first aspect is preferably configured such that the electromagnetic wave irradiator continues to induce the plasma after the active chemical species has been produced when the working fluid is ignited, whereby a space is formed having an energy density equal to or greater than the minimum ignition energy of the working fluid in the presence of the active chemical species.

According to a seventh aspect, the ignition/chemical reaction promotion/flame holding device of the first through sixth aspects is preferably configured such that the timing with which the active chemical species is supplied is determined based on fluctuations over time in at least one of the flow rate of the working fluid in the combustor when the active chemical species is supplied, the rate disturbance, the rate the substance diffuses, the temperature, the pressure, the local amount of heat generated, the fuel concentration, the chemical reaction rate, the rate of production of the active chemical species, and the rate of active consumption of the active chemical species.

According to an eighth aspect, the ignition/chemical reaction promotion/flame holding device of the first through sixth aspects is preferably configured such that the electromagnetic wave irradiator intermittently emits electromagnetic wave pulses at a timing determined based on the flow rate of working fluid in the combustor and the time duration over which the active chemical species remains active.

According to a ninth aspect, the ignition/chemical reaction promotion/flame holding device of the first through sixth aspect is preferably configured such that the electromagnetic wave irradiator intermittently irradiates the active chemical species with electromagnetic wave pulses with a timing, frequency, number of frequency components, or form of emission determined based on the cycle and/or phase of combustion oscillation in the combustor.

According to a tenth aspect, the ignition/chemical reaction promotion/flame holding device of the first through ninth aspects is preferably configured such that the location in the combustor of the region where the active chemical species is supplied is determined based on the spatial distribution of at least one of the flow rate of the working fluid in the combustor when the active chemical species is supplied, the rate disturbance, the rate the substance diffuses, the temperature, the pressure, the local amount of heat generated, the fuel concentration, the chemical reaction rate, the rate of production of the active chemical species, and the rate of active consumption of the active chemical species.

According to an eleventh aspect, the ignition/chemical reaction promotion/flame holding device of the first through ninth aspects is preferably configured such that the active chemical species is supplied to the vicinity of a center axis of the combustor.

According to a twelfth aspect, the ignition/chemical reaction promotion/flame holding device of the first through ninth aspects is preferably configured such that the active chemical species is supplied to the vicinity of a fuel injection device of the combustor, the vicinity of a side wall, or the vicinity of an outlet.

According to a thirteenth aspect, the ignition/chemical reaction promotion/flame holding device of the first through twelfth aspects is preferably configured such that the active chemical species is carried by the flow of the working fluid and supplied to the region.

According to a fourteenth aspect, the ignition/chemical reaction promotion/flame holding device of the first through thirteenth aspects is preferably configured such that the charged particle preparation portion prepares the charged particles through one or a plurality of production methods selected from a group of plasma production methods consisting of discharge, laser-induced breakdown, working fluid friction, and combustion.

According to a fifteenth aspect, the ignition/chemical reaction promotion/flame holding device of the first through thirteenth aspects is preferably configured such that the charged particle preparation portion prepares thermoelectrons.

According to a sixteenth aspect, the ignition/chemical reaction promotion/flame holding device of the first through fourteenth aspects is preferably configured such that the electromagnetic wave irradiator comprises an antenna and either an oscillator or a semiconductor oscillator composed of a magnetron, an oscillation circuit, and a modulation circuit.

According to a seventeenth aspect, the ignition/chemical reaction promotion/flame holding device of the first aspect of the present invention is preferably configured such that an active chemical species produced from the working fluid by the effect of the plasma is supplied, whereby a region in which temperature conditions for performing combustion are fulfilled is formed in the combustor.

According to an eighteenth aspect, a speed-type internal combustion engine, wherein the ignition/chemical reaction promotion/flame holding device according to any of aspects 1 through 16 is installed in at least one of a side wall internal surface of the combustor, the vicinity of a stepback, a flame holder, the vicinity of a gutter, the vicinity of a swirler, an injector, an air inlet, a fuel inlet, and a terminal end vicinity of the combustor.

According to a nineteenth aspect, the speed-type internal combustion engine according to aspect 18 comprises an observation portion observing a preselected region in the combustor and creating a signal expressing the result; a holding portion holding information expressing an admissible value of the result; a detecting portion detecting the difference between the observation result from the observation portion and the information; a storing portion storing the relationship between an input sent to the ignition/chemical reaction promotion/flame holding device and the produced plasma; and a determining portion determining the input sent to the ignition/chemical reaction promotion/flame holding device from the difference and the relationship in accordance with a predetermined function in response to the detection of the difference by the detecting portion; the speed-type internal combustion engine, wherein the input sent to the ignition/chemical reaction promotion/flame holding device is controlled according to the determination made by the determining portion.

According to a twentieth aspect, the speed-type internal combustion engine according to aspect 18 comprises auxiliary charged particle preparation portion preparing charged particles in a location determined based on the temperature distribution, pressure distribution, or working fluid density distribution in a combustion chamber; and an auxiliary electromagnetic wave irradiator irradiating the charged particles and their surrounding vicinity with electromagnetic wave pulses in order to induce plasma in the region; the speed-type internal combustion engine, wherein the working fluid is heated by the effect of the plasma.

According to a twenty-first aspect, the speed-type internal combustion engine according to aspect 18 or 19 is configured such that the ignition/chemical reaction promotion/flame holding device is actuated and phenomena that take place in the combustor are controlled by the plasma.

According to a twenty-second aspect, a furnace, wherein the ignition/chemical reaction promotion/flame holding device according to any of aspects 1 through 16 is installed in at least one of a side wall internal surface of the combustor, a side wall internal surface of the combustor, the vicinity of a stepback, a flame holder, the vicinity of a gutter, the vicinity of a swirler, an injector, an air inlet, a fuel inlet, and a terminal end vicinity of the combustor.

In the ignition/chemical reaction promotion/flame holding device, according to the first aspect, ignition and flame holding can be performed without increasing the combustion temperature because an active chemical species produced from the working fluid by the effect of the plasma is supplied, whereby a region in which sufficient conditions for performing combustion are fulfilled is formed in the combustor. Furthermore, flames can be formed having an extremely high combustion rate, similar to that of volumetric ignition. This contributes to the improvement of the combustion characteristics and to the size and weight reduction of the combustor.

According to the third aspect, continuing microwave pulse irradiation while the temperature of gas or ions in the plasma remains less than the electron temperature in the plasma makes it possible to obtain nonequilibrium plasma. It is thereby possible to efficiently produce a large amount of active chemical species.

According to the fourth and sixth aspects, ignition is performed by forming a space having an energy density equal to or greater than the minimum ignition energy of the working fluid in the presence of the active chemical species. In the presence of the active chemical species, ignition can be performed even when the energy density is less than the usual minimum ignition energy. It is thereby possible for ignition to be performed without the forming of hot spots.

According to the seventh aspect, it is possible to perform appropriate flame holding corresponding to fluctuations over time in at least one of the flow of working fluid through the combustor, disturbance, diffusion rate, temperature, pressure, and fuel concentration; and combustion can be stabilized.

According to the eighth aspect, since electromagnetic wave pulses are intermittently emitted with a timing determined based on the flow rate of working fluid in the combustor and the time duration over which the active chemical species remains active, the operational effects of ignition and combustion promotion from the plasma or the active chemical species originating from the plasma can be efficiently and continually achieved with a low energy input in all of the working fluid supplied for combustion.

According to the ninth aspect, combustion oscillation is possible through the effect of the active chemical species.

According to the tenth aspect, since the location in the combustor of the region where the active chemical species is supplied is determined based on the spatial distribution of at least one of the flow rate of the working fluid in the combustor when the active chemical species is supplied, the disturbance, the diffusion rate, the temperature, the pressure, and the fuel concentration, it is possible to alleviate the effects of fuel concentration, working fluid temperature, and pressure in the combustor; and to create the desired working fluid flow, disturbance, diffusion, temperature distribution, and pressure distribution in the combustor.

According to the eleventh aspect, by supplying the active chemical species to the vicinity of the center axis of the combustor, it is possible to obtain a flame distribution such that combustion/the reaction is performed in the vicinity of the center axis. Not only is it thereby possible to simplify the cooling mechanism of the inner liner and to make size and weight reduction easier, but the efficiency of combustion can also be improved.

According to the twelfth aspect, it is possible to obtain a flame distribution such that combustion/the reaction is performed in the vicinity of the fuel injection device of the combustor, in the vicinity of the side wall, or in the vicinity of the outlet.

According to the thirteenth aspect, since the active chemical species is carried by the working fluid and supplied to the region, the active chemical species can take effect over a wider range.

According to the fourteenth aspect, it is possible for plasma to grow and enlarge and also for the active chemical species to be produced and supplied with the aid of charged particles produced by discharge, laser induced breakdown, working fluid friction, or combustion.

According to the fifteenth aspect, it is possible for plasma to grow and enlarge and also for the active chemical species to be produced and supplied with the aid of thermoelectrons.

According to the sixteenth aspect, an existing common microwave source can be used to produce the microwaves to be used in ignition, chemical reaction promotion, and flame holding.

In the speed-type internal combustion engine of the eighteenth aspect, the desired operational effects of aspects 1 through 16 can be obtained in the desired region in the combustor.

Specifically, it is possible to provide an ignition/chemical reaction promotion/flame holding device and a high-performance speed-type internal combustion engine using this device, whereby combustion and the spreading and holding of flames can be dramatically improved in a speed-type internal combustion engine.

DETAILED DESCRIPTION OF THE INVENTION

Embodiments will be described below with reference to the drawings.

Figure 1:
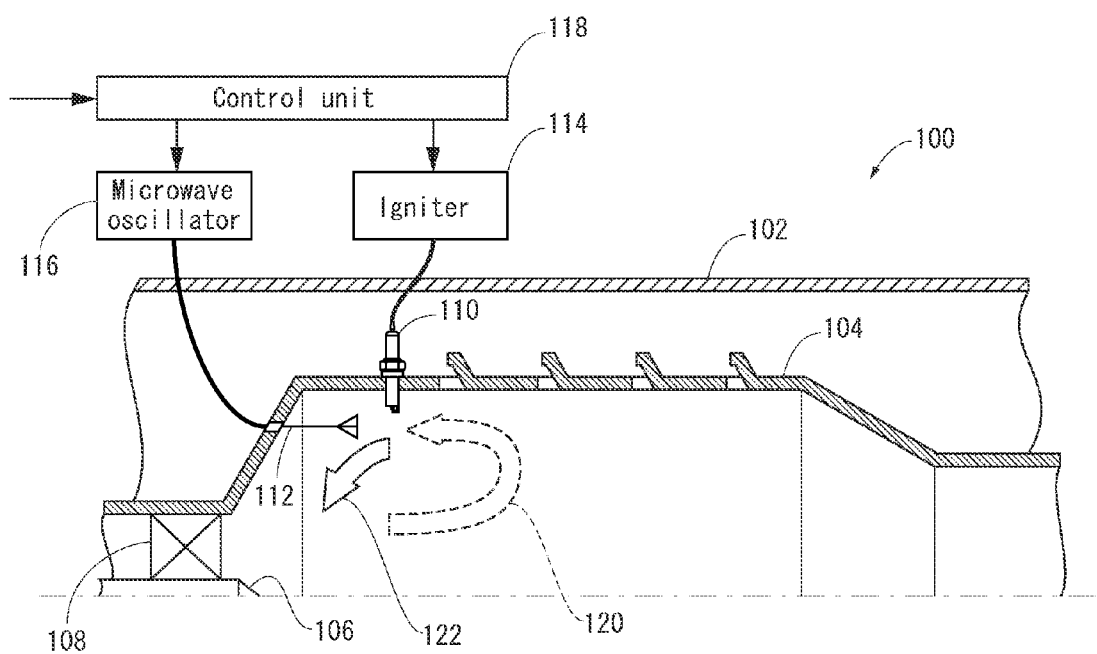
FIG. 1 is a cross-sectional view that shows the internal structure of the combustor according to the first embodiment of the present invention.

FIG. 1 schematically depicts the internal configuration of a combustor 100 of a gas turbine engine according to a first embodiment of the present invention.

The combustor 100 is a combustor that uses air as an oxidizing agent in the same manner as a common gas turbine engine, and this combustor has an outer liner 102, an inner liner 104, an injector 106 for injecting fuel into the inner liner 104, and a swirler 108, as shown in FIG. 1. This combustor 100 does not have a pilot burner.

The combustor 100 also comprises a spark plug 110 and antenna 112 inserted through the inner liner 104, an igniter 114 for applying an ignition signal to the spark plug 110, a microwave oscillator 116 for supplying a microwave pulse to the antenna 112, and a control device 118 for sending instruction signals to the igniter 114 and the microwave oscillator 116. In the present embodiment, the system composed of the spark plug 110, the antenna 112, the igniter 114, the microwave oscillator 116, and the control device 118 has the function of an ignition/chemical reaction promotion/flame holding device.

As with a spark plug in a common gas turbine, the spark plug 110 is disposed in the vicinity of a region where recirculation 120 occurs (hereinbelow referred to as the "recirculate zone") due to the action of the swirler 108. However, the spark plug 110 and the igniter 114 according to the present embodiment do not need to be designed for large quantities of heat for a gas turbine, and may be designed for about 20 mJ to 50 mJ for a common automobile or an even lower output.

The antenna 112 is set up facing the gap (hereinbelow referred to as the "discharge gap") between the electrodes of the spark plug 110. Specifically, the antenna is set up oriented towards the discharge gap so as to achieve at least certain benefits. The material selected for the combustor 100 is preferably, e.g., tungsten, a nickel alloy, an iridium alloy, or another material having excellent heat resistance, in view of the fact that the interior of the combustor 100 reaches high temperatures. A flat antenna capable of being installed on the inner liner 104 may also be used, one that can obtain a cooling effect from the inner liner 104.

The microwave oscillator 116 oscillates microwaves of several GHz in the form of pulses. Specifically, the microwave oscillator is composed of a pulse power source comprising an inverter or the like and a magnetron that oscillates at 2.45 GHz for a household microwave oven. The microwave oscillation may be performed by a semiconductor oscillator for wireless communication or by an oscillation circuit. Since these oscillators do not require a transformer or the like, they are easily made lightweight by a torch or another oscillator for forming plasma by microwaves alone. The duration of a single microwave pulse generated by the microwave oscillator 116 is preferably several nanoseconds to several microseconds.

In response to external signals, the control device 118 controls the application of ignition signals by the igniter 114, the timing with which microwave pulses are oscillated by the microwave oscillator 116, and the oscillation strength of the microwaves by the microwave oscillator 116.

Concerning the timing, the control device 118 performs a control so as to create an overlap between the time period of discharge by the spark plug 110 and the time period in which microwave pulses are radiated. Only in cases in which there are flames either in the vicinity of the antenna 112 or in the radiating direction of the antenna 112 is control performed so that the microwave pulses are oscillated without any discharging by the spark plug 110.

(Ignition Using Plasma)

In the combustor 100 of the present embodiment, ignition is performed in the following manner, for example.

When compressed air flows into the inner liner 104 via the swirler 108 and fuel is also supplied by being sprayed by the injector 106, the air and the fuel mix together in the recirculation zone while being stirred by the recirculation 120, and a pre-mixture is formed in the vicinity around the spark plug 110. In this state, prompted by external signals, the control device 118 sends instruction signals to the igniter 114 and the microwave oscillator 116. The igniter 114 applies an ignition signal to the spark plug 110 in response to the instruction signal, and the microwave oscillator 116 begins oscillating the microwave pulses.

In the spark plug 110, discharge begins and plasma is created in the discharge gap. Microwave pulses are radiated from the antenna 112 in this state. The plasma created in the discharge gap enlarges and grows upon receiving the energy of the microwave pulses. The rate at which the plasma enlarges and grows at this time instantly reaches several hundred meters per hour.

Having rapidly enlarged and grown in this manner, the plasma acts on the pre-mixture, sequentially causing the electrons in the plasma to accelerate and collide with the molecules, and causing dissociation or ionization of the molecules in the pre-mixture. Molecular ions, atomic ions, radicals, molecules having unstable bonds, and other active chemical species having high chemical activity are produced by this dissociation or ionization. For example, ozone molecules or other chemically unstable molecules are produced from the oxygen in the air. OH radicals are produced from the water in the air. Some of these examples gradually recombine either within or in the vicinity of the plasma. Others rapidly enlarge away from the vicinity of the spark plug 110 along with the expansion of the plasma. Others flow along a bulk. As a result, a region having a high concentration of active chemical species is formed in an extremely short amount of time in a range extending downstream of the bulk from the vicinity of the spark plug 110.

In this region, ignition takes place from the beginning of a chemical chain reaction through heat exchange between the oxygen molecules in the air and the unreacted fuel molecules, to the beginning of a chain reaction between oxidized active chemical species produced by the effects of the plasma and reducing active chemical species. The energy density needed for this chain reaction to begin is less than the minimum ignition energy in the relevant region. Therefore, a region having a high concentration of active chemical species will be a region in which ignition occurs very readily.

In this region, it is surmised that ignition takes place through the following process, for example.

Specifically, when the temperature and pressure conditions of the region of highly concentrated active chemical species yield in advance an energy density sufficient to begin an active chemical species reaction as well as energy less than the minimum ignition energy, the entire region instantly ignites at the point in time when the region of highly concentrated active chemical species is formed. As a result, ignition takes place in a manner very closely resembling volumetric ignition.

It is also surmised that ignition could take place through the following process. When discharge by the spark plug 110 or microwave pulse radiation from the antenna 112 continues, the energy density increases in the region exposed to the discharge or microwave radiation. Ignition will occur eventually. Particularly in the case of continuing microwaves, the electrons in the flames formed by ignition are accelerated by exposure to the energy of the microwave pulses. This prompts plasma to be formed by the flames, and the plasma rapidly grows and enlarges through the same process described above. As a result, the propagation of a high-speed reaction is achieved, which could not be achieved with common flame propagation.

(Flame Holding Using Plasma and Active Chemical Species)

When there are flames in the direction of microwave radiation by the antenna 112 and microwave pulses are emitted by the antenna 112; plasma forms, enlarges, and grows from the flames as a starting point in the portion exposed to the irradiation of the microwaves. When there is a portion in which flames are not sufficiently propagated, due to the temperature, pressure, and/or the mixed ratio of fuel and air being unsuitable in the region surrounding the starting point; the concentration of active chemical species in this portion is increased by the effects of the enlarging and growing plasma. As a result, combustion is stabilized in this portion. If this is intermittently repeated, combustion continues and the flames are held.

When there are no flames in the direction of microwave radiation by the antenna 112, discharge is performed by the spark plug 110 in addition to the microwave radiation from the antenna 112. In this case, a small amount of plasma formed by the discharge is a starting point for plasma growth and expansion and for the production and expansion of active chemical species. As a result, if the region in which the active chemical species enlarges has sufficient energy density for a reaction caused by the active chemical species, combustion will begin again in the region at that point in time. When the region of increased active chemical species concentration reaches the region in which flames are present, this prompts flames to be rapidly propagated through the region of increased active chemical species concentration. Combustion is thereby maintained, and the flames are held.

(Desired Operational Effects of Present Embodiment)

In the present embodiment as described above, ignition and flame holding are achieved by the production and expansion of plasma and by the accompanying production and supply of active chemical species. It is possible for a region of large volume to instantly reach ignition at a comparatively low temperature and in a form of ignition similar to volumetric ignition, without extremely high-temperature hot spots being formed by the spark plug, the pilot burner, the plasma torch, or other components during ignition. The effects of hot spots can thereby be reduced, and cooling can be simplified. This contributes to weight reduction, greater efficiency, and to minimizing the production of nitrogen oxide. This makes the pilot burner unnecessary, and fuel can be conserved. This contributes to weight reduction, energy conservation, and reducing the load on the environment.

Since the energy density required by the active chemical species to begin the reaction can be reduced, it is possible for ignition to be reliably performed even if the pressure, temperature mixed ratio, and other conditions in the ignition location are not optimal for ignition. The success rate of ignition increases. The turndown ratio becomes greater, and ignition becomes simpler.

During flame holding, the flames can be held without anything causing resistance to the flow of the working fluid, as is the case with a flame holder. This contributes to greater efficiency. In addition, combustion can be selectively promoted in regions of insufficient combustion or regions in which combustion has not yet occurred. This contributes to uniformity and stability of combustion in the combustor 100. If combustion is performed in a uniform and stable manner, the formation of regions having unnecessarily high combustion temperatures can be reduced. This contributes to the solving the problem of hot spots. In practice, nonuniformity of heat production can be reduced even if the mixture, pressure, temperature and load of the fuel change or become nonuniform. It is possible to achieve a state of combustion similar to a state in which combustion takes place under ideal mixture, pressure, and temperature conditions. The turndown ratio becomes greater, and combustion oscillation near the lean limit can be reduced.

Additionally, in the present embodiment, the rate of combustion is increased by the action of the active chemical species. It is thereby possible to shorten the distance over which the working fluid moves through the combustor 100 from the start of combustion until the end. Therefore, the length of the combustor itself can be reduced. This contributes to size reduction and weight reduction of the gas turbine engine.

If the time period of a single emission of microwave radiation is several nanoseconds to several hundred nanoseconds, it is possible to selectively form only plasma in a state in which the electrons, molecules, ions, or radicals in the plasma have not yet reached thermal equilibrium (a state of nonequilibrium). Active chemical species can be produced very efficiently in this nonequilibrium plasma because the deactivation of active chemical species by heat can be avoided. If the time period of a single emission of microwave radiation is 1 microsecond, the formation and expansion of plasma can be ended before the plasma reaches 1500 degrees. This contributes to the reduction of nitrogen oxide (so-called thermal $NO_x$).

(Modification 1 of First Embodiment)

Figure 2:
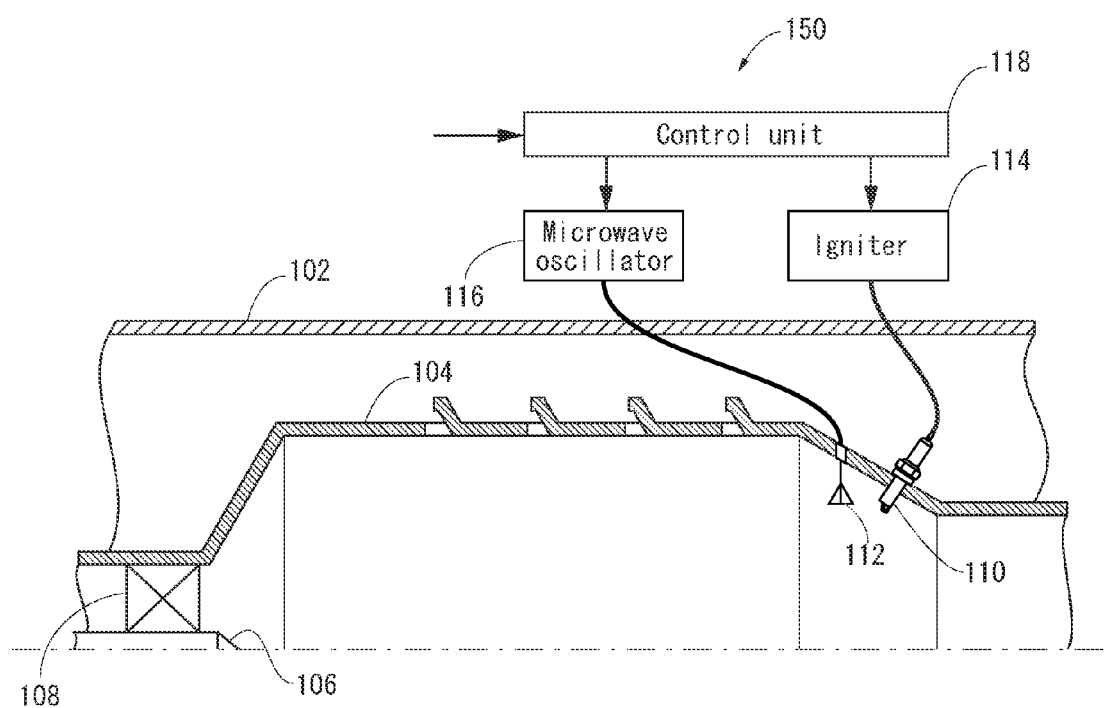
FIG. 2 is a cross-sectional view that shows the internal configuration of the combustor according to the first modification of the first embodiment.

The spark plug 110 and the antenna 112 do not need to be disposed in the upstream side in the inner liner 104. For example, they may be disposed in the vicinity of the terminal end of the inner liner 104, as in the combustor 150 shown in FIG. 2. With this positional arrangement, combustion can be performed with a mixture that has been sufficiently premixed. Since the rate of combustion is high in the ignition and flame holding method of the system according to the present embodiment, the spark plug 110 and the antenna 112 may be disposed farther downstream than an ignition device or flame holder would be in a conventional system. With this manner of arrangement, effects similar to those of an afterburner or greater are achieved without causing afterburning by using an afterburner having poor fuel consumption.

(Modification 2 of First Embodiment)

Figure 3:
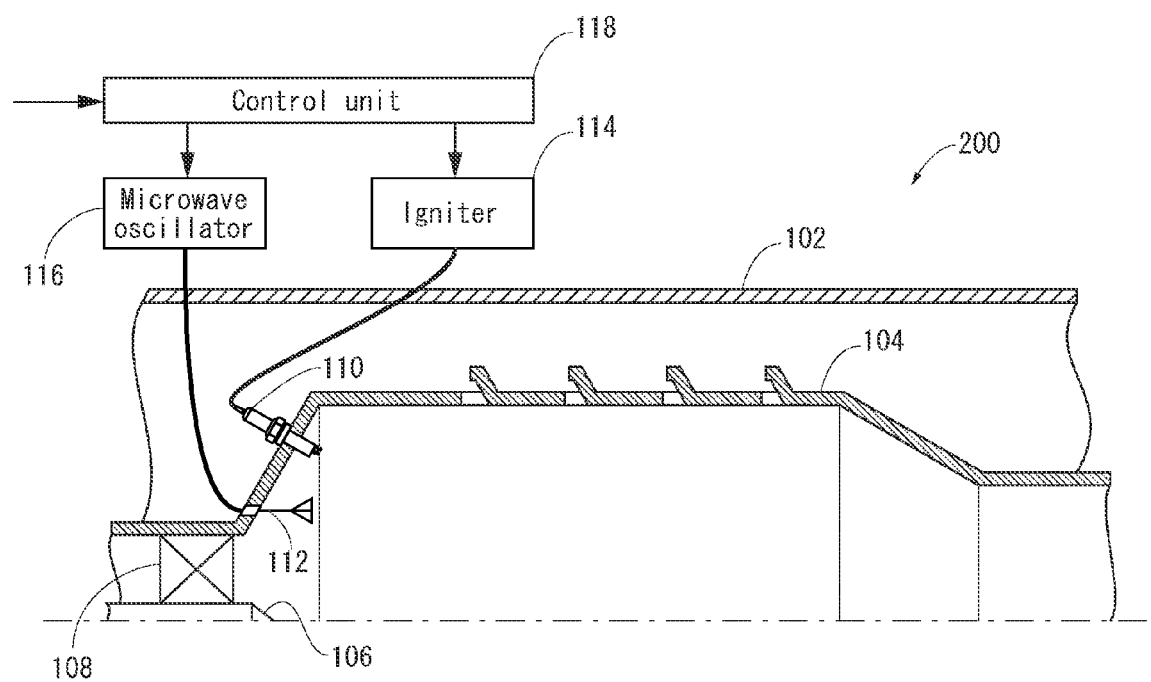
FIG. 3 is a cross-sectional view that shows the internal structure of the combustor according to the second modification of the first embodiment.

The spark plug 110 and the antenna 112 may be disposed nearer to the center axis than the usual installed location of a spark plug, as in the combustor 200 shown in FIG. 3. If the antenna is disposed in a position near the center axis, it will be proportionately easier to hold flames in the region in the vicinity of the center axis. If flame holding can be performed in a stable manner in this region, flames having a high rate of combustion can be obtained without forcing recirculation by the swirler 108 and creating a strong turbulent flow. This contributes to greater efficiency in accelerating the working fluid. Being nearer the center axis makes it easier for the active chemical species to be carried by the flow of the working fluid and conveyed through a wider region in the inner liner 104. Consequently, the desired operational effects described above, which are achieved by flame holding and ignition by the production of active chemical species using plasma, can be obtained in a wider region in the inner liner 104.

Second Embodiment

Figure 4:
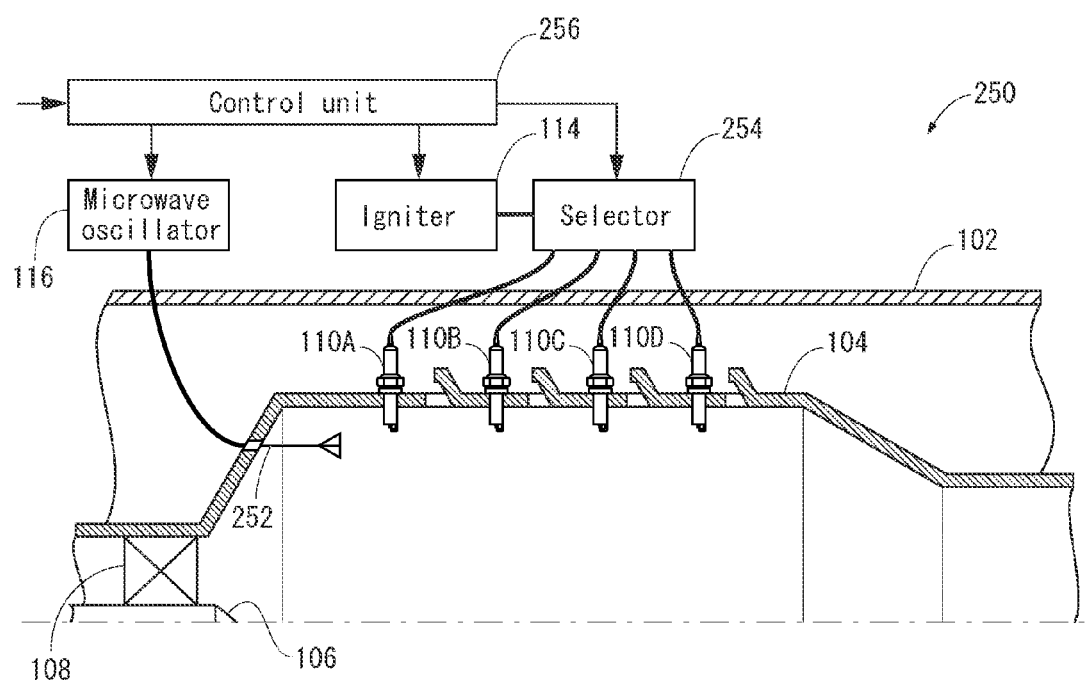
FIG. 4 is a cross-sectional view that shows the internal structure of the combustor according to the second embodiment of the present invention.

FIG. 4 shows the internal configuration of a combustor 250 according to the second embodiment.

In this combustor 250, a plurality of spark plugs 110A . . . 110D are attached to the inner liner 104, as shown in FIG. 4. The spark plugs 110A . . . 110D are connected to the igniter 114 via a selector 254. A control unit 256 has a function for controlling the selection of output by the selector 254, in addition to the function of the control device 118 according to the first embodiment.

An antenna 252 according to the present embodiment may be the same as the antenna 112 according to the first embodiment, but this antenna preferably has a certain degree of directivity in order for the microwaves to reliably reach the location of the discharge gaps of the spark plugs 110A . . . 110D.

In the present embodiment, during ignition or re-ignition, and also when flame holding is performed using the spark plugs, the selector 254 selects which spark plug will discharge from among the spark plugs 110A . . . 110D, in accordance with an instruction signal from the control unit 256. Specifically, plasma enlarges and grows using the discharge gap of the selected spark plug as a starting point, and an active chemical species is produced.

If a plurality of spark plugs is arranged in this manner and the spark plug used during operation is selected appropriately, the effective range of the desired operational effects of the active chemical species can be enlarged in the inner liner 104. It also becomes easier to cause the active chemical species to take effect in the desired location.

In the present embodiment, an example was presented of a configuration comprising a plurality of spark plugs, but a plurality of antennas 252 may also be included. If pluralities of both antennas and spark plugs are used, the selectivity of the location where the active chemical species is supplied will improve, and it will be easier to obtain the desired distribution and change over time in the active chemical species.

Third Embodiment

Figure 5:
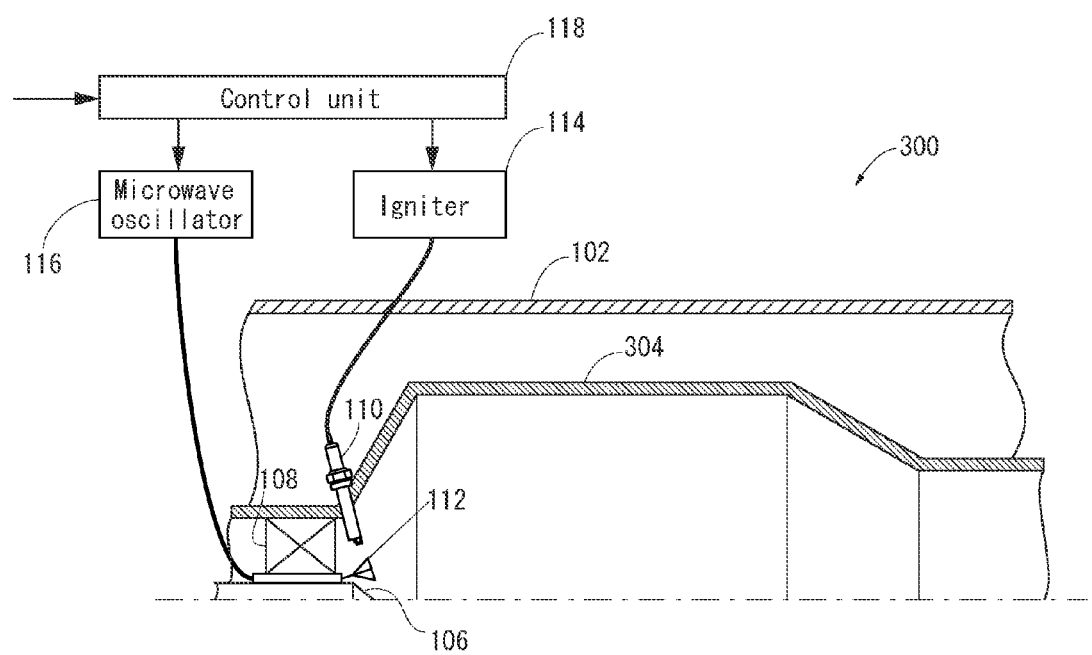
FIG. 5 is a cross-sectional view that shows the internal structure of the combustor according to the third embodiment of the present invention.

FIG. 5 shows the internal configuration of a combustor 300 according to the third embodiment.

In the present embodiment, the antenna 112 is installed in a position nearer to the center axis than the swirler 108 in the combustor 300, and the spark plug is installed in proximity to the antenna 112, as shown in FIG. 5. In the combustor according to the present embodiment, the inner liner 304 does not have an air intake hole for cooling.

In the present embodiment, when discharge and microwave pulse radiation is performed and plasma is formed to produce active chemical species, the active chemical species requiring the most time to deactivate out of all the active chemical species flows along with the main flow of the working fluid. This active chemical species causes ignition or flame holding to take place in the vicinity of the center axis, and a distribution of flames is formed such that flames are present only in the vicinity of the center axis. The distribution of the combustion temperature is such that the temperature becomes progressively lower approaching the inner liner 304 from the center axis.

When the active chemical species is distributed so that flames concentrate in the vicinity of the center axis in this manner, the flames can be kept away from the inner liner 304, and the temperature increase of the inner liner 304 can be reduced. Therefore, the air between the outer liner 102 and the inner liner 304 does not need to be blown into the inner liner to cool the inner liner, and the structure of the inner liner can be simplified. This contributes to weight reduction and cost reduction.

Thus, since there is no need to cool the inner liner by using air in the present embodiment, the air (or oxidizing agent) supplied into the combustor 300 can be used for combustion without any loss. This contributes to improving efficiency. Specifically, an improvement in combustion efficiency of about 4% can be expected.

Fourth Embodiment

Figure 6:
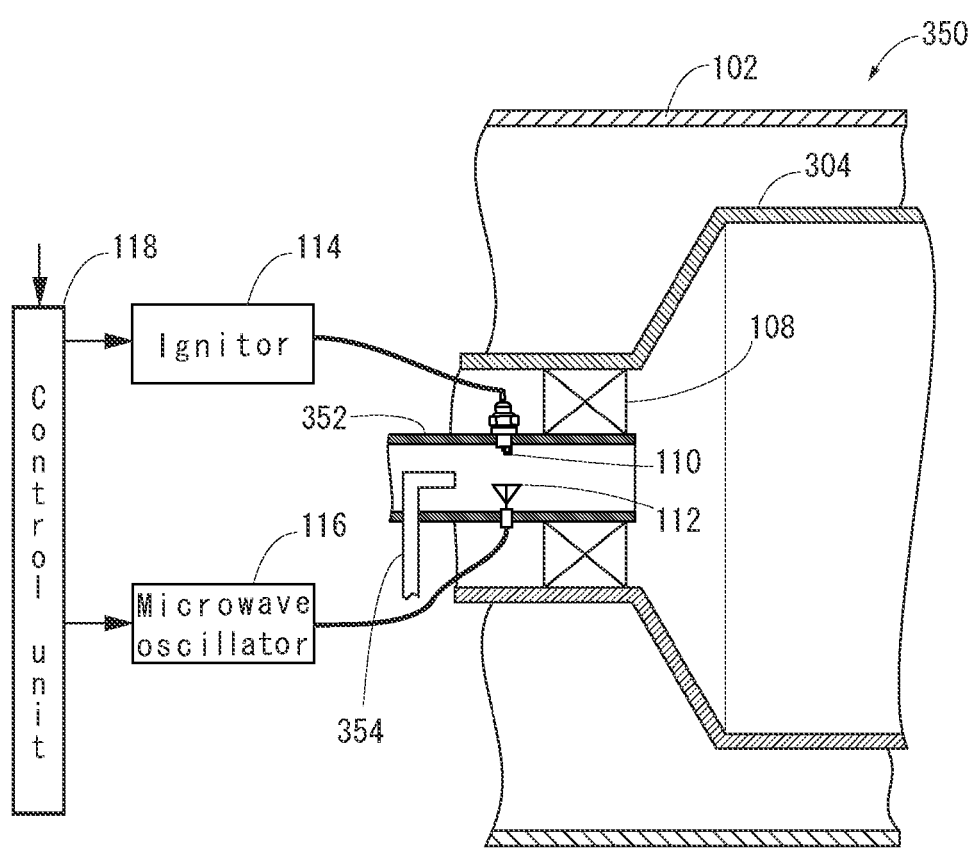
FIG. 6 is a cross-sectional view that shows the internal structure of the combustor according to the fourth embodiment of the present invention.

FIG. 6 shows the internal configuration of a combustor 350 according to the fourth embodiment.

The combustor 350 has the same inner liner 304 as the combustor 300 of the third embodiment, as shown in FIG. 6. Instead of the injector 106, the combustor has a pipe 352 through which fuel and air pass, and a nozzle 354 for supplying fuel into the pipe 352.

In the present embodiment, the spark plug 110 and the antenna 112 are disposed upstream of the swirler 108 on the internal side of the pipe 352. In the combustor 350, combustion is performed in the vicinity of the center axis, similar to the combustor 300 according to the third embodiment.

In the present embodiment, microwave pulses are repeatedly radiated during flame holding. The cycle of microwave pulse repetition can be determined, e.g., in the following manner. For example, the value is found thus: the distance in the center axial direction of the region over which the active chemical species enlarges without deactivating due to a single microwave pulse radiation is divided by the flow rate, and from the resulting time, the time needed for the active chemical species to enlarge to the region is subtracted, and the emission time of a single microwave irradiation is added thereto. In this manner, the active chemical species resulting from the plasma can be made to act on the entire amount of working fluid passing through the pipe 352.

The cycle of microwave pulse repetition can also be determined in the following manner, for example. Specifically, the cycle of combustion oscillation may be the repetition cycle when combustion oscillation occurs. In this case, the timing of microwave pulse oscillation is adjusted so that combustion is promoted by an active chemical species with the timing by which combustion is weakened by combustion oscillation. Combustion oscillation can thereby be cancelled out. The frequency itself of combustion oscillation can be changed by increasing the rate of combustion.

Since the spark plug 110 and the antenna 112 are disposed in the vicinity of the fuel nozzle, there is concern over fuel adhesion, but it is possible for the spark plug 110 and the antenna 112 to be automatically cleaned through the incinerating effect of the plasma.

In the present embodiment, the pipe interior in the vicinity of the nozzle 354 is configured for forming plasma, but flame holding may be performed in the inner liner 304 by this manner of repeating microwave oscillation. The active chemical species can thereby be made to act on all of the working fluid led into the combuster. Essentially, the same operational effects can be achieved as performing flame holding throughout the entire combustor.

Fifth Embodiment

Figure 7:
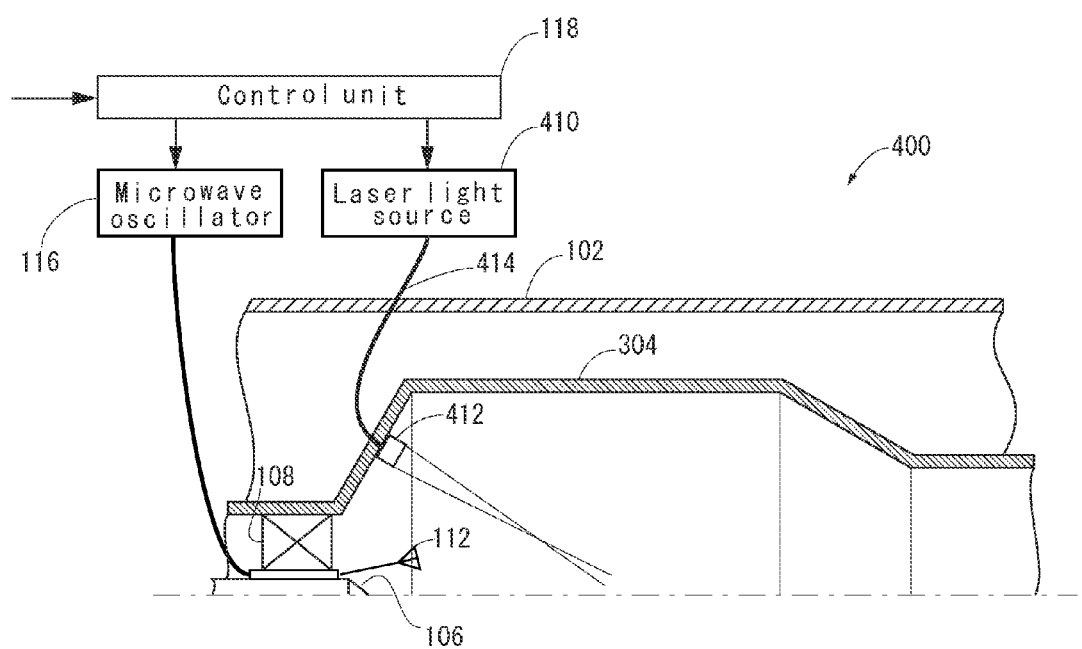
FIG. 7 is a cross-sectional view that shows the internal structure of the combustor according to the fifth embodiment of the present invention.

FIG. 7 shows the internal configuration of a combustor 400 according to the fifth embodiment.

In the present embodiment, instead of the igniter 114 and the spark plug 110 in the third embodiment described above, the combustor 400 comprises a laser light source 410, and a light-collecting optical system 412 disposed so as to face into the inner liner 304 and connected to one end of an optical fiber 414, the optical fiber being connected at the other end to the laser light source 410 and passing through the inner liner 304, as shown in FIG. 7. In this combustor 400, instead of plasma being produced by discharge using a spark plug during ignition and other times, plasma is produced by laser-induced breakdown. In the present embodiment, the laser directed into the inner liner need not be of a high output as long as ignition of the mixture is achieved by the laser alone, similar to a low output of the spark plug 110 being sufficient in the first embodiment.

In the present embodiment, the position where plasma is formed, which is the starting point for plasma growth and expansion using microwave pulses during ignition and other times, is not determined depending on the position of the discharge gap; i.e., the placement of the spark plug. Plasma as a starting point can be produced in any desired position in the inner liner. Therefore, selectivity is improved for the ignition position and the position where plasma is formed for flame holding.

Plasma as a starting point may also be produced using a plasma production method consisting of working fluid friction and combustion. A starting point for plasma production and expansion, not plasma production alone, may also be obtained by leading only thermoelectrons and other charged particles into the combustor.

Sixth Embodiment

Figure 8:
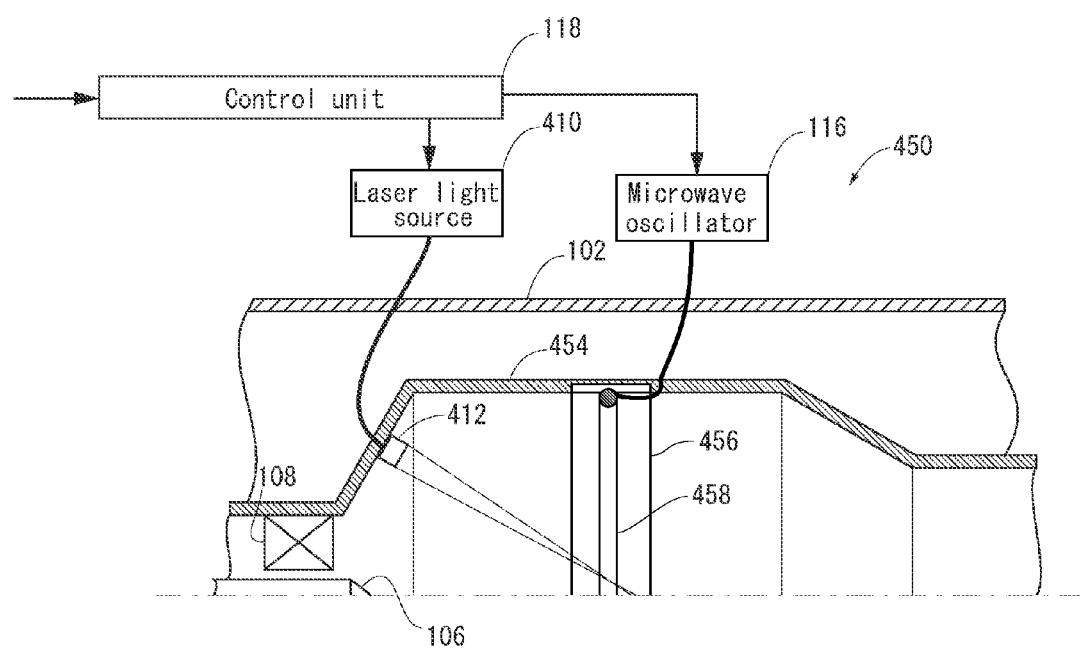
FIG. 8 is a cross-sectional view that shows the internal structure of the combustor according to the sixth embodiment of the present invention.

The antennas in the embodiments described above preferably yield benefits in terms of electromagnetic waves having the oscillation frequency of the microwave oscillator 116, and various shapes and forms can be envisioned for the antennas. For example, a ring-shaped antenna 458 may be provided in the interior of an inner liner 454, as in the combustor 450 shown in FIG. 8. In the case that the inner liner 454 is a metal or another type of conductor, the antenna 458 is connected to the inner liner 454 via a member 456 composed of a dielectric substance.

These types of antennas are not the only option, and a flat antenna, for example, may also be used. An antenna composed of a plurality of antenna elements may also be used. The antenna may also be an aperture antenna, a typical example of which is a horn antenna; or an antenna comprising a reflector. A vane separate from the antenna may also be disposed inside the combustor, and the electromagnetic waves may be resonated in the vane. A single vane or a plurality of vanes may be provided, and a so-called ESPAR antenna may be configured from these vanes.

Seventh Embodiment

Figure 9:
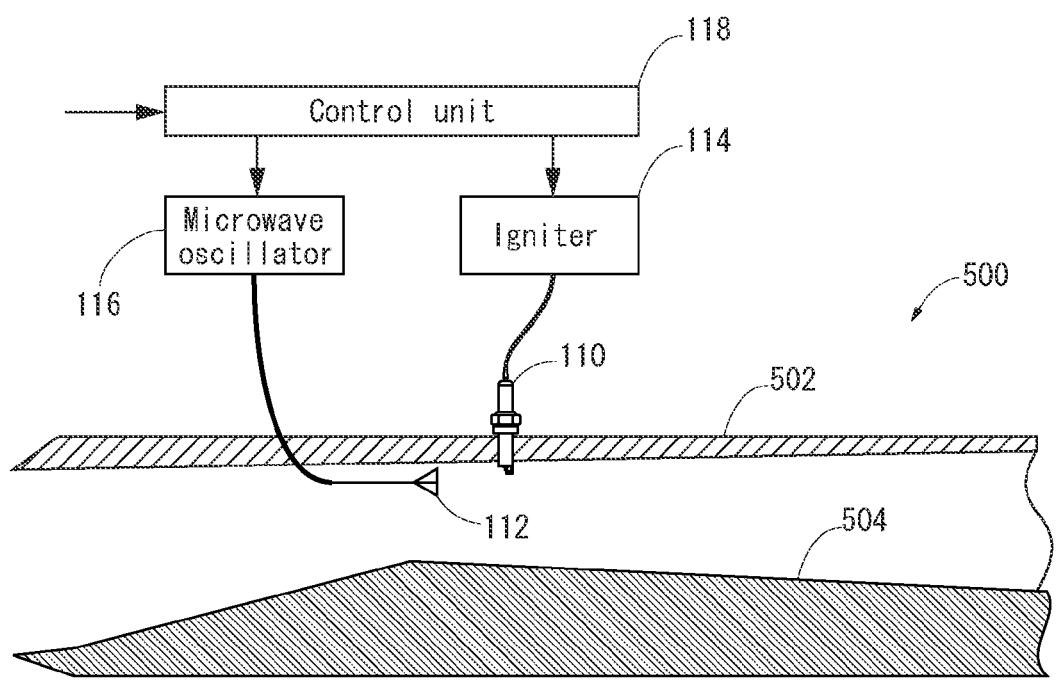
FIG. 9 is a cross-sectional view that shows an example of the present invention applied to the ram machine of an ignition/chemical reaction promotion/flame holding device.

The present invention is not limited to a gas turbine engine, and can also be applied to a ram machine (a ramjet engine or a scramjet engine) or a rocket engine. For example, the spark plug 110 and the antenna 112 may be provided in the flow channel of the working fluid between side walls 502 and 504 of the combustor (ramjet engine) 500, as shown in FIG. 9. Since the rate at which the plasma and active chemical species enlarges is extremely fast as described above, the flames are not blown out, as is the case with flame holding using a torch or burner. Consequently, reliable ignition and flame holding can be performed even in a ram machine, which the working fluid passes through the combustor at an extremely high rate.

Other Embodiment (1)

As an alternative to the arrangements exemplified in the embodiments described above; the device can be installed in the vicinity of the gutter, the vicinity of the swirler, in the injector, or in the air inlet; and ignition, chemical reaction promotion, and flame holding can be performed. The device may also be disposed upstream of the swirler or on the external side of the air inlet as seen from the combustor if the chemical species produced by the effect of the plasma is led all the way into the combustor.

The timing and supplied location of the active chemical species using plasma may be determined based on the flow rate of the working fluid in the combustor when the active chemical species is supplied, the rate disturbance, the diffusion rate of the substance, the temperature, the pressure, the local amount of heat generated, the fuel concentration, the chemical reaction rate, the rate of production of the active chemical species, the active consumption rate of the active chemical species, or their fluctuation over time or spatial distribution. For example, a combination of the embodiments described above can also be used. By suitably selecting or combining these embodiments, the desired concentration distribution of active chemical species can be formed in the combustor at any desired time during ignition or flame holding. Specifically, the effects of the fuel concentration, working fluid temperature, and pressure within the combustor can be alleviated, and the working fluid flow, disturbance, diffusion, temperature distribution, and pressure distribution within the combustor can be set as desired. Specifically, combustion in a speed-type internal combustion engine can be controlled in real time.

It is thereby possible, e.g., to alleviate the effects of shock waves caused by recess, to reduce combustion oscillation, and to change frequency. It is also generally easy to adapt to changes in the load in a speed-type internal combustion engine. This contributes to making the speed-type internal combustion engine more versatile.

In the embodiments described above, ignition, chemical reaction promotion, or flame holding are performed by the effect of the active chemical species; but the heat of the plasma may also be used for ignition, chemical reaction promotion, or flame holding. For example, the working fluid in the combustion chamber may be further heated by the plasma, obtaining the desired temperature distribution or pressure distribution. It is thereby possible to promote mixing by heat, to control ignition delays, and to create a desired spatial distribution or time distribution of various chemical species. Creating a temperature distribution also makes it possible to control the direction and rate of flow of the working fluid, the spread angle, and other characteristics.

The combustor may be annular, cannular, silo-shaped, or formed in any other common shape.

In the embodiment described above, an example was presented of a speed-type internal combustion engine as well as an ignition/chemical reaction promotion/flame holding device used therein; but ignition, chemical reaction promotion, flame holding, and control can be performed in a furnace by the same method as in a speed-type internal combustion engine.

Other Embodiment (2)

In the embodiments described above, the input for actuating the ignition/chemical reaction promotion/flame holding device can be controlled based on observations of the combustor interior. The following manner of control may be used, for example. Specifically, a photography device is arranged inside the combustion chamber, or an optical detector is arranged so that light is received from one or more predetermined regions in the combustion chamber, and observations are made. What is admissible as observation results is prepared in advance and stored in a storage device. These admissible observation results may be observation results in a case of combustion being appropriately performed, or an admissible range of observation results may be indicated. Information created using a simulation may also be used. Furthermore, the input to the ignition/chemical reaction promotion/flame holding device as well as the conditions for producing plasma (i.e., location, size, time of production, continuing duration, as well as electron density, temperature, pressure, and the like) may be designated associations and stored in a storage device. Furthermore, a comparator is connected to the photography device or optical detector and to the storage device, and comparisons are made between the admissible observation results and the actual observation results. If differences are detected from these comparisons, the input to the ignition/chemical reaction promotion/flame holding device is determined with reference to the correlations stored in the storage device.

The inputs based on storage, comparison, and correlation of information may be determined by a computer system that operates using common computer hardware, a program operated by the hardware, and data either stored in the hardware or readably stored in the hardware. The configuration and operation of the computer system itself may be conventional, and a description of the details thereof need not be repeated. Ignition, chemical reaction promotion, and flame holding can be dynamically controlled by this manner of control.

The observation results from the photography device or optical detector may be used in the comparison after degradation of the wavelength components has been performed using a spectrometer, a filter, or the like. The comparison may also be made after these optical observations have been converted to information pertaining to temperature, pressure, heat quantity generated, chemical components, and other factors using various conventional methods. The comparison results provided for the comparison may also be converted in a temporal direction. The observations are not limited to optical methods such as those described above, and may also be made using various sensors, either collectively or selectively.

The observations may be made at one point or at a plurality of points. They may also be made throughout the entire combustor. The information stored in order to control the observations does not necessarily need to be in the form of numerical values displayed by a map or the like. The observations may also be expressed through the procedure and process of a program, or by a function or the like.

The antenna used for radiating electromagnetic waves may also be, e.g., an aperture antenna such as a horn antenna. When possible, the shape and material of the gas flow channel may be configured so that the gas flow channel itself is the waveguide or doubles as the aperture antenna. The antenna may also be configured having a radiating element composed of an element connected to a source for generating electromagnetic waves, and a reflector for reflecting the electromagnetic waves from the radiating element. The antenna may also be configured having a radiating element as well as vanes or resonant elements acting as a medium for the electromagnetic waves radiating from the radiating element.

A variety of combinations are possible for the relationship between the number of regions to be irradiated by electromagnetic waves and the number of antennas. Electromagnetic waves from a plurality of antennas or a plurality of antenna elements may be irradiated on a single target region. Moreover, in cases where a plurality of regions having strong electric fields are formed in a space, as with an antenna provided with elements having an electrical length of, e.g., ¾ of a wavelength or more, a plurality of regions to be irradiated by electromagnetic waves may be set for each antenna according to the number of regions having strong electric fields. The charged particles that lead to the formation of plasma may also be prepared in the plurality of set regions, and plasma may be formed simultaneously in a plurality of regions.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

The invention claimed is:

1. An ignition/chemical reaction promotion/flame holding device for a speed-type internal combustion engine, comprising:
a charged particle preparation portion preparing charged particles in a predetermined location in a combustor of the speed-type internal combustion engine or in a working fluid inlet passage leading to the combustor of the speed-type internal combustion engine; and
one or a plurality of electromagnetic wave irradiators provided with an antenna irradiating the charged particles and their surrounding vicinity with electromagnetic wave pulses in order to induce plasma, a working fluid in the combustor of the speed-type internal combustion being used as a starter material,
wherein the antenna is a flat antenna installed on an inner liner of the combustion engine, and
wherein an active chemical species produced from the working fluid by an effect of the plasma is supplied, whereby a region, in which sufficient conditions for performing combustion are fulfilled, is formed in the combustor of the speed-type internal combustion engine.

2. The ignition/chemical reaction promotion/flame holding device according to claim 1, wherein the one or a plurality of electromagnetic wave irradiators continue to radiate electromagnetic wave pulses while a temperature of gas or ions in the plasma remains less than an electron temperature in the plasma after plasma induction has begun.

3. The ignition/chemical reaction promotion/flame holding device according to claim 1, wherein the charged particle preparation portion continues to prepare the charged particles after the active chemical species has been produced when the working fluid is ignited, whereby a space is formed having an energy density equal to or greater than a minimum ignition energy of the working fluid in the presence of the active chemical species.

4. The ignition/chemical reaction promotion/flame holding device according to claim 1, wherein the plasma causes a region having an energy density equal to or greater than a minimum ignition energy and a region having an energy density less than a minimum ignition energy to be distributed in a time domain or a space domain.

5. The ignition/chemical reaction promotion/flame holding device according to claim 1, wherein the one or a plurality of electromagnetic wave irradiators continues to induce the plasma after the active chemical species has been produced when the working fluid is ignited, whereby a space is formed having an energy density equal to or greater than a minimum ignition energy of the working fluid in the presence of the active chemical species.

6. The ignition/chemical reaction promotion/flame holding device according to claim 1, wherein a timing with which the active chemical species is supplied is determined based on fluctuations over time in at least one of a flow rate of the working fluid in the combustor of the speed-type internal combustion engine when the active chemical species is supplied, a rate disturbance, a rate the substance diffuses, a temperature, a pressure, a local amount of heat generated, a fuel concentration, a chemical reaction rate, a rate of production of the active chemical species, and a rate of active consumption of the active chemical species.

7. The ignition/chemical reaction promotion/flame holding device according to claim 1, wherein the one or the plurality of electromagnetic wave irradiators intermittently emits electromagnetic wave pulses at a timing determined based on a flow rate of the working fluid in the combustor of the speed-type internal combustion engine and a time duration over which the active chemical species remains active.

8. The ignition/chemical reaction promotion/flame holding device according to claim 1, wherein the one or the plurality of electromagnetic wave irradiators intermittently irradiates the active chemical species with electromagnetic wave pulses with a timing, frequency, number of frequency components, or form of emission determined based on a cycle and/or phase of combustion oscillation in the combustor of the speed-type internal combustion engine.

9. The ignition/chemical reaction promotion/flame holding device according to claim 1, wherein the predetermined location in the combustor of the speed-type internal combustion engine of the region where the active chemical species is supplied to is determined based on a spatial distribution of at least one of a flow rate of the working fluid in the combustor of the speed-type internal combustion engine when the active chemical species is supplied, a rate disturbance, a rate the substance diffuses, a temperature, a pressure, a local amount of heat generated, a fuel concentration, a chemical reaction rate, a rate of production of the active chemical species, and a rate of active consumption of the active chemical species.

10. The ignition/chemical reaction promotion/flame holding device according to claim 1, wherein the active chemical species is supplied to a vicinity of a center axis of the combustor of the speed-type internal combustion engine or a vicinity of a fuel injection device of the combustor of the speed-type internal combustion engine, a vicinity of a side wall, or a vicinity of an outlet.

11. The ignition/chemical reaction promotion/flame holding device according to claim 1, wherein the active chemical species is supplied to a vicinity of a fuel injection device of the combustor of the speed-type internal combustion engine, a vicinity of a side wall, or a vicinity of an outlet.

12. The ignition/chemical reaction promotion/flame holding device according to claim 1, wherein the active chemical species is carried by a flow of the working fluid and supplied to the region.

13. The ignition/chemical reaction promotion/flame holding device according to claim 1, wherein the charged particle preparation portion prepares the charged particles through one or a plurality of production methods selected from a group of plasma production methods consisting of discharge, laser-induced breakdown, working fluid friction, and combustion.

14. The ignition/chemical reaction promotion/flame holding device according to claim 1, wherein the charged particle preparation portion prepares thermoelectrons.

15. The ignition/chemical reaction promotion/flame holding device according to claim 1, wherein an active chemical species produced from the working fluid by the effect of the plasma is supplied, whereby a region, in which temperature conditions for performing combustion are fulfilled, is formed in the combustor of the speed-type internal combustion engine.

16. The ignition/chemical reaction promotion/flame holding device according to claim 1, wherein
the flat antenna is installed at a position nearer to a center axis of the combustion engine than the charged particle preparation portion.

17. A speed-type internal combustion engine, wherein an ignition/chemical reaction promotion/flame holding device according to claim 1 is installed in at least one of a side wall internal surface of the combustor of the speed-type internal combustion engine, a vicinity of a stepback, a flame holder, a vicinity of a gutter, a vicinity of a swirler, an injector, an air inlet, a fuel inlet, and a terminal end vicinity of the combustor of the speed-type internal combustion engine.

18. The speed-type internal combustion engine according to claim 17, comprising:
an observation portion, observing a preselected region in the combustor of the speed-type internal combustion engine and creating a signal expressing the result;
a holding portion, holding an information value expressing an admissible value of the result;
a detecting portion detecting a difference between an observation result from the observation portion and the information value;
a storing portion, storing a relationship between an input sent to the ignition/chemical reaction promotion/flame holding device and the plasma; and
a determining portion, determining the input sent to the ignition/chemical reaction promotion/flame holding device from the difference and the relationship in accordance with a predetermined function in response to the difference detected by the detecting portion, resulting in a determination;
the speed-type internal combustion engine, wherein the input sent to the ignition/chemical reaction promotion/flame holding device is controlled according to the determination made by the determining portion.

19. The speed-type internal combustion engine according to claim 17, comprising:
an auxiliary charged particle preparation portion preparing charged particles in a location determined based on a temperature distribution, pressure distribution, or working fluid density distribution in a combustion chamber; and
an auxiliary electromagnetic wave irradiator irradiating the charged particles and their surrounding vicinity with electromagnetic wave pulses in order to induce plasma in the region; the speed-type internal combustion engine,
wherein the working fluid is heated by the effect of the plasma.

20. The speed-type internal combustion engine according to claim 17, wherein the ignition/chemical reaction promotion/flame holding device is actuated and phenomena that take place in the combustor of the speed-type internal combustion engine are controlled by the plasma.

21. A furnace, wherein an ignition/chemical reaction promotion/flame holding device according to claim 1 is installed in at least one of a side wall internal surface of the combustor of the speed-type internal combustion engine, a side wall internal surface of the combustor of the speed-type internal combustion engine, a vicinity of a stepback, a flame holder, a vicinity of a gutter, a vicinity of a swirler, an injector, an air inlet, a fuel inlet, and a terminal end vicinity of the combustor of the speed-type internal combustion engine.

* * * * *